United States Patent
McDiarmid et al.

(10) Patent No.: US 10,433,229 B2
(45) Date of Patent: *Oct. 1, 2019

(54) CODEC-SPECIFIC HANDOVER THRESHOLDS

(71) Applicant: T-Mobile USA, Inc., Bellevue, WA (US)

(72) Inventors: Mark McDiarmid, Seattle, WA (US); Jun Liu, Issaquah, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/863,836

(22) Filed: Jan. 5, 2018

(65) Prior Publication Data
US 2018/0132156 A1    May 10, 2018

Related U.S. Application Data

(63) Continuation of application No. 14/985,251, filed on Dec. 30, 2015, now Pat. No. 9,867,106.

(51) Int. Cl.
*H04W 36/26* (2009.01)
*H04W 36/30* (2009.01)
(Continued)

(52) U.S. Cl.
CPC ..... *H04W 36/26* (2013.01); *H04W 36/00837* (2018.08); *H04W 36/08* (2013.01); *H04W 36/24* (2013.01); *H04W 36/30* (2013.01)

(58) Field of Classification Search
CPC ..... H04W 36/08; H04W 36/24; H04W 36/26; H04W 36/30
See application file for complete search history.

(56) References Cited

U.S. PATENT DOCUMENTS

2009/0073936 A1    3/2009   Jentz et al.
2009/0097451 A1    4/2009   Gogic
(Continued)

FOREIGN PATENT DOCUMENTS

WO    WO2009093799    7/2009
WO    WO2015025548    2/2015

OTHER PUBLICATIONS

3GPP; TSG RAN; "Evolved Universal Terrestrial Radio Access (E-UTRA) and Evolved Universal Terrestrial Radio Access Network (E-UTRAN); Overall description; Stage 2 (Release 13)", 3GPP TS 36.300 V13.1.0, Sep. 24, 2015, 255 pages.
(Continued)

*Primary Examiner* — Pao Sinkantarakorn
*Assistant Examiner* — Kabir U Jahangir
(74) *Attorney, Agent, or Firm* — Lee & Hayes, P.C.

(57) ABSTRACT

A handover procedure can be implemented using a codec-specific threshold as a triggering event for the handover procedure. A mobile device can initiate a communication session with a serving access point (AP). The mobile device can receive a codec established for the communication session, access a set of codec-specific thresholds stored in memory of the mobile device to determine a handover triggering threshold that is specific to the codec used for the communication session. The mobile device can measure a parameter of a radio signal from the serving AP, and when the measured parameter falls below the codec-specific threshold, a handover procedure can be initiated to transition the communication session to a target AP.

20 Claims, 6 Drawing Sheets

(51) Int. Cl.
*H04W 36/24* (2009.01)
*H04W 36/08* (2009.01)
*H04W 36/00* (2009.01)

(56) References Cited

U.S. PATENT DOCUMENTS

| | | |
|---|---|---|
| 2010/0287079 A1 | 11/2010 | Cai et al. |
| 2011/0002305 A1 | 1/2011 | Park et al. |
| 2013/0084860 A1 | 4/2013 | Wong et al. |
| 2016/0021673 A1 | 1/2016 | Ahmadzadeh et al. |
| 2016/0212674 A1 | 7/2016 | Nakamura et al. |
| 2017/0195932 A1 | 7/2017 | McDiarmid et al. |

OTHER PUBLICATIONS

Office Action for U.S. Appl. No. 14/985,251, dated Jul. 28, 2017, Mark McDiarmid, "Codec-specific Handover Thresholds", 43 pages.
PCT Search Report and Written Opinion dated Apr. 10, 2017 for PCT Application No. PCT/US16/67796, 9 pages.
Extended European Search Report dated Apr. 11, 2019 for European Patent Application No. 16882375.5, 10 pages.

CODEC-SPECIFIC HANDOVER THRESHOLDS

CROSS REFERENCE TO RELATED APPLICATION

This patent application is a continuation of and claims priority to co-pending and commonly assigned U.S. patent application Ser. No. 14/985,251, filed Dec. 30, 2015, entitled "CODEC-SPECIFIC HANDOVER THRESHOLDS," which is hereby incorporated in its entirety by reference.

BACKGROUND

A given base station of a cellular network has limited coverage. In order to provide service to users that move between geographic locations, handover procedures have been implemented that allow for a communication session on a mobile device to transition from a serving base station to a target base station as the mobile device moves away from the serving base station and toward the target base station. This allows the user to continue a communication session (e.g., a voice call) while moving between geographic locations. To initiate a handover procedure, a mobile device takes radio signal strength measurements from the serving base station and compares these measurements to a handover triggering threshold previously received from the serving base station. If a measurement is below the threshold, a handover procedure is triggered so that an ongoing communication session can be transitioned to a target base station.

However, using a single handover triggering threshold is suboptimal in view of the "heterogeneous" nature of current cellular networks that support both legacy technologies and new technologies. For example, consider a legacy mobile device using a legacy technology (e.g., a narrowband audio codec) for a voice call served by a particular base station, and a new mobile device using a newer technology (e.g., a super wideband audio codec) for a voice call served by the same base station. Both the legacy device and new device will initiate respective handover procedures at the same radio signal level, which is determined by the single handover triggering threshold provided by the serving base station to each device. Because the new device uses newer technology that may extend the distance from the serving base station that the new device can stay on the communication session, the single handover triggering threshold can trigger a handover procedure for the new device earlier than necessary. Since there is an inherent risk of dropping a communication session during a handover procedure, this introduces an unneeded risk of a dropped communication session for the new device. If the handover triggering threshold provided by the serving base station is lowered to accommodate the extended coverage of the new device, the lowered threshold does not work for the legacy device due to the more limited coverage provided by the legacy technology it uses. For example, as the legacy device moves away from the serving base station, the lowered threshold may not even be crossed before the communication session of the legacy device is dropped.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
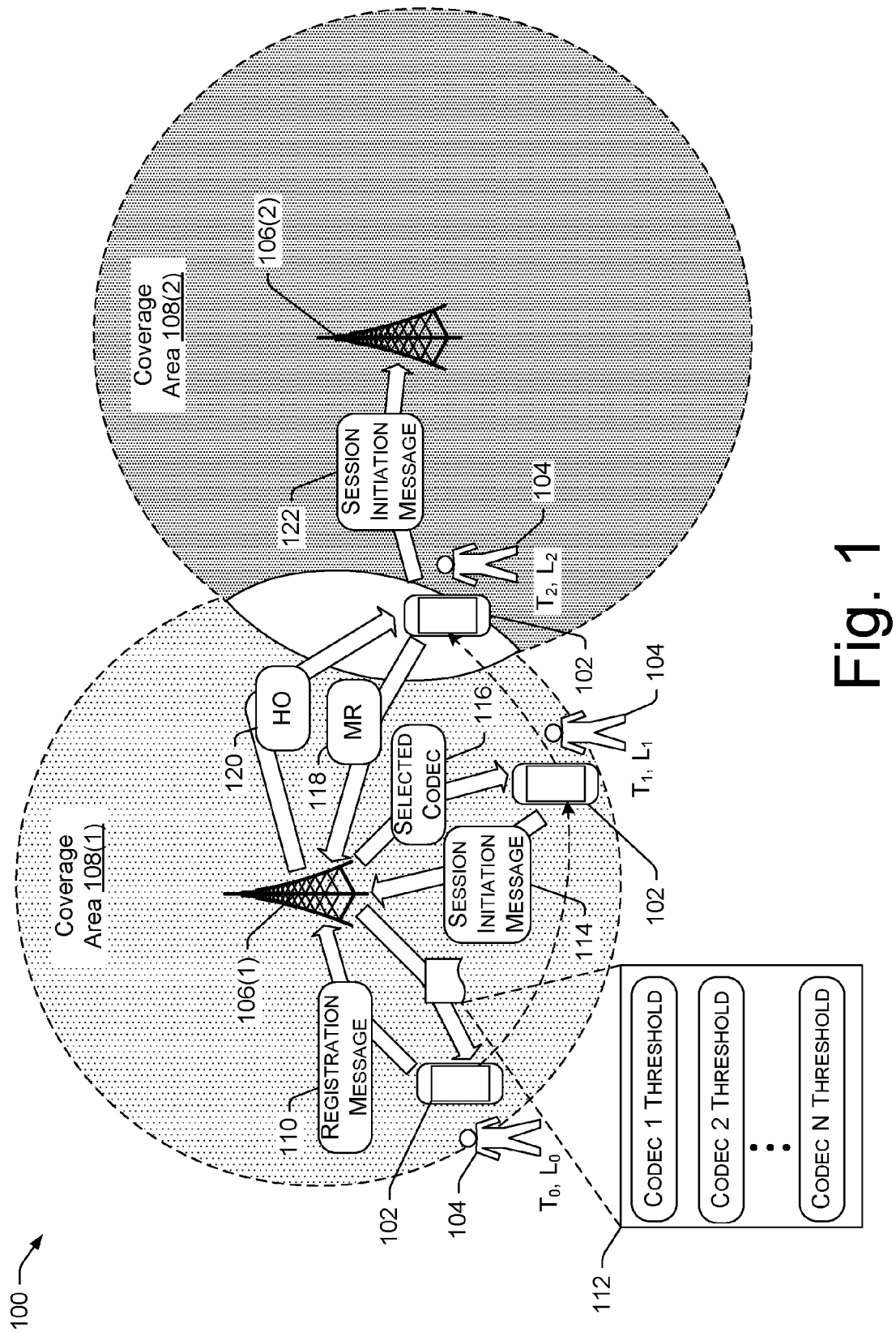
FIG. 1 illustrates an example cellular network environment for implementing a handover procedure for a mobile device by utilizing a codec-specific threshold.

Newer mobile devices, such as fourth generation (4G) Long Term Evolution (LTE)-compliant mobile devices, are configured to employ the latest audio and video codecs to establish voice and video communication sessions. With respect to audio codecs, for example, some newer mobile devices are configured to support Enhanced Voice Services (EVS), which is an audio codec defined in the 3rd Generation Partnership Project (3GPP) standard for provisioning voice over LTE (VoLTE) services. The EVS audio codec can use a higher sampling rate as compared to its predecessor audio codecs, which allows for new wideband audio technologies, such as high definition (HD) voice (sometimes referred to as "HD calling").

The improved coding scheme of EVS not only provides clearer-sounding calls, but also enables a mobile device to stay connected to access point (AP) in relatively poor radio conditions. This means that the EVS audio codec can extend the voice call range for the mobile device, which allows a user to continue a voice communication session at a greater distance from the serving AP, or in much poorer radio conditions served by an AP, as compared to other audio codecs, such as the Adaptive Multi-Rate (AMR) audio codec. In general, as cellular networks continue to evolve, newer technologies can provide enhancements that allow for improved performance of the devices that utilize the cellular networks as compared to the performance that legacy technologies can provide.

Still, there is a transition period as legacy technologies phase out and as new technologies are adopted, which causes cellular networks to remain "heterogeneous" with a mixture of legacy and non-legacy technologies. In other words, not all user equipments (UEs) are capable of supporting the latest technologies, such as the EVS audio codec. These UEs that cannot support the latest technologies are referred to as "legacy devices." As a result, some voice communication sessions are encoded/decoded using the EVS audio codec, while other voice communication sessions—particularly those involving legacy devices—are encoded/decoded using a different audio codec, such as AMR, AMR Wideband (AMR-WB), and so on.

Described herein are techniques and systems for implementing a handover procedure for a mobile device by utilizing a codec-specific threshold. The techniques and systems described herein are aimed at leveraging the performance enhancements gained by newer codecs, such as the EVS audio codec, in the implementation of an improved, codec-specific handover procedure. For example, since the EVS audio codec extends the useful range of voice communications on a mobile device, a handover triggering threshold that is specific to the EVS audio codec can be used by the mobile device in deciding when to trigger a handover procedure when a communication session uses EVS as the audio codec. Likewise, a different handover triggering threshold that is specific to the AMR-WB audio codec can be used by the mobile device in deciding when to trigger a handover procedure when a communication session uses AMR-WB as the audio codec.

In some embodiments, a process to be implemented on a mobile device includes initiating a communication session over an Internet Protocol (IP) Multimedia Subsystem (IMS) core network (sometimes referred to as the "IMS core", or the "Core Network (CN)") using a selected codec, wherein a serving access point (AP) is used to access the IMS core. The mobile device may access, from memory of the mobile device, a data structure that maintains a first codec-specific threshold in association with a first codec and a second codec-specific threshold in association with a second codec. In this manner, the selected codec used for the communication session can be compared to the codecs in the data structure, and upon detecting a matching codec in the data structure, the mobile device measures a parameter of a radio signal from the serving AP to obtain a radio signal measurement and compares the radio signal measurement to the codec-specific threshold associated with the matching codec in the data structure. If the radio signal measurement is below the codec-specific threshold, a handover procedure is triggered where the communication session is transitioned from the serving AP to a target AP in communication range of the mobile device.

Also disclosed herein are systems comprising one or more processors and one or more memories, as well as non-transitory computer-readable media storing computer-executable instructions that, when executed, by one or more processors perform various acts and/or processes disclosed herein.

By implementing a handover procedure that utilizes a codec-specific threshold, a mobile device can take full advantage of the performance enhancements provided by newer codecs, such as the extended voice calling range provided by the channel-aware EVS audio codec. In this manner, a user can carry a mobile device during a communication session as far from a serving AP as possible before a handover procedure is initiated so that handover is performed when it is suitable to do so. This, in turn, eliminates the risk of dropping a communication session in situations where a handover is unnecessary and an established codec is capable of continuing the communication session at farther distances from a serving AP. Moreover, network resource usage is reduced by avoiding handover procedures where it is not necessary to perform a handover, since handover procedures involve sending network traffic between a mobile device and a serving AP. A further benefit of the techniques and systems described herein is realized when a mobile device moves away from a serving AP employing a newer radio access technology (RAT) toward a target AP employing a legacy RAT (e.g., a 2G cell tower). In this situation, the mobile device will stay on a communication session using the newer codec before transitioning the communication session to the legacy RAT where a legacy codec may be re-negotiated for the communication session.

Example Environment

FIG. 1 illustrates an example cellular network environment 100 for implementing a handover procedure for a mobile device 102 by utilizing a codec-specific threshold. The mobile device 102 may be implemented as any suitable mobile computing device configured to communicate over a wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), and/or any similar mobile device 102. In accordance with various embodiments described herein, the terms "wireless communication device, "wireless device," "communication device," mobile device," and "user equipment (UE)" may be used interchangeably herein to describe any mobile device 102 capable of performing the techniques described herein. The mobile device 102 may be capable of communicating wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), Institute of Electrical and Electronics Engineers (IEEE) 802.1x protocols, WiMAX, wireless fidelity (Wi-Fi™), and/or any future IP-based network technology or evolution of an existing IP-based network technology.

FIG. 1 further illustrates a user 104 who is associated with the mobile device 102. The user 104 may have subscribed to services that a carrier (or cellular network operator) provides to its customers. Such a carrier may utilize the IMS for delivering IP multimedia to UEs of its customers, such as the mobile device 102 associated with user 104. The IMS core permits UEs, such as the mobile device 102, to conduct voice and data communication sessions over the IMS core.

Accessing the IMS core typically involves the mobile device 102 communicating with the IMS core through an access point (AP), such as the AP 106(1). In the example of FIG. 1, the AP 106(1) is in the form of a cellular-based AP (e.g., a base station or enhanced NodeB (eNodeB)). In this manner, the user 104 (or subscriber) may access services from the IMS core using the mobile device 102 that communicates with the IMS core through the AP 106(1) acting as a serving AP 106(1) during an ongoing communication session.

The AP 106(1) is shown as having a limited coverage area 108(1) in terms of the geographical area or space in which the mobile device 102 can effectively access the IMS core via the AP 106(1), which is due in part to propagation loss of radio signals that increases with increased distance from the serving AP 106(1). Accordingly, when the mobile device 102 moves farther away from a serving AP 106(1) during an ongoing communication session, the radio signal strength will eventually fall to an unacceptable level. This can result in a communication session with poor quality, or even a dropped communication session as the mobile device 102 continues to move farther away from the serving AP 106(1). Accordingly, when the user 104 moves to a location where the radio signal strength falls below a codec-specific threshold, a handover procedure can be initiated in order to transition the communication session from the serving AP 106(1) to a target AP 106(2) when the mobile device 102 moves within the coverage area 108(2) of the target AP 106(2) and is therefore within communication range of the target AP 106(2).

FIG. 1 illustrates an example implementation of a cell-to-cell handover where an ongoing communication session served by a serving base station AP 106(1) is transferred to a target base station AP 106(2). FIG. 1 also illustrates a cellular network environment 100 that is suitable for implementing a "mobile-assist, network-controlled" handover procedure. A "mobile-assist, network-controlled" handover procedure is one where many of the operations involved in controlling the handover procedure are performed by the serving AP 106(1) during an ongoing communication session, and where the mobile device 102 transmits information (e.g., radio signal measurements) to the serving AP 106(1) in order to assist the serving AP 106(1) during the handover procedure. Accordingly, the APs (collectively 106) in FIG. 1 may be capable of communicating wirelessly using a cellular-based wireless communications/data technology, protocol, or standard, such as GSM, TDMA, UMTS, EVDO, LTE, LTE+, GAN, UMA, CDMA, OFDM, GPRS, EDGE, AMPS, HSPA, HSPA+, VoIP, VoLTE, and/or any future IP-based network technology or evolution of an existing IP-based network technology. As will be described below with reference to the following figures, the techniques and systems are not limited to the implementation shown in FIG. 1, which is presented merely for illustrative purposes as an example implementation.

FIG. 1 shows the user 104 at time, $T_0$, and location, $L_0$, while carrying the mobile device 102 within the coverage area 108(1) of the serving AP 108(1). The mobile device 102 may be in an "idle mode" at time, $T_0$, and location, $L_0$, where the mobile device 102 is not actively engaged in a communication session. For example, the user 104 may be carrying the mobile device 102 in his/her pocket or a bag, but the mobile device 102 may remain powered on and in idle mode so that the mobile device 102 can camp on (or attach to) the AP 106(1). In order to attach to the AP 106(1), the mobile device 102 can perform a registration process to register for, and thereafter access and utilize, one or more IMS-based services from the IMS core via the AP 106(1). Such IMS-based services may include, without limitation, multimedia telephony services (e.g., voice calling), video conferencing services, and the like.

To register for IMS-based services via the AP 106(1), the mobile device 102 may send a registration message 110 to the AP 106(1). In some embodiments, the registration message 110 can comprise a Session Initiation Protocol (SIP) message. SIP is a signaling protocol that can be used to establish, modify, and terminate multimedia sessions over packet networks, and to authenticate access to IMS-based services. SIP has been standardized by the Internet Engineering Task Force (IETF). A "SIP request" is a message that is sent from the mobile device 102 to the IMS core using SIP protocol. A "SIP response" is a message that is sent from the IMS core to the mobile device 102 using SIP protocol. In an illustrative example with reference to FIG. 1, the registration message 110 may comprise a SIP REGISTER method. Once authenticated, the mobile device 102 can establish a radio link with the AP 106(1).

The AP 106(1) is configured to respond to the receipt of the registration message 110 by transmitting a set of codec-specific thresholds 112 to the mobile device 102. FIG. 1 illustrates that the set of codec-specific thresholds 112 can include respective thresholds for codec 1, codec 2, . . . , codec N (codecs 1-N). The set of codec-specific thresholds 112 may relate to audio codecs and/or video codecs that may be used in communication sessions involving the mobile device 102. Each threshold in the set of codec-specific thresholds 112 corresponds to a particular codec. For example, the "codec 1 threshold" may correspond to the EVS audio codec, while the "codec 2 threshold" may correspond to the AMR-WB audio codec, and the "codec N threshold" may correspond to the AMR audio codec. These are exemplary audio codecs and it is to be appreciated that the set of codec-specific thresholds 112 may correspond to any suitable audio codecs. The set of codec-specific thresholds 112 may additionally, or alternatively, relate to video codecs used in video-based communication sessions involving the mobile device 102. As such, some or all of the thresholds in the set of codec-specific thresholds 112 may correspond to video codecs used for video-based communication sessions (e.g., video conferencing), such as the H.263 video codec, the MPEG-4 video codec, the H.264 video codec, and so on.

In some embodiments, the AP 106(1) may transmit a set of codec-specific thresholds 112 that correspond to a predetermined set of audio codecs and/or video codecs such that any mobile device 102 that successfully registers with the AP 106(1) can receive the same set of codec-specific thresholds 112. In other embodiments, the set of codec-specific thresholds 112 sent to the mobile device 102 can be device-specific in that the AP 106(1) can customize the set of codec-specific thresholds 112 to correspond to the codecs that the mobile device 102 is capable of employing. For example, if the mobile device 102 is not capable of employing the EVS audio codec, the set of codec-specific thresholds 112 may not include a threshold corresponding to the EVS audio codec. The AP 106(1) can determine the particular codec-specific thresholds to include in the set of codec-specific thresholds 112 based on capabilities that can be transmitted from the mobile device 102 to the AP 106(1). The mobile device 102 can send its capabilities to the AP 106(1) in the registration message 110 or in a separate message, such as a SIP OPTIONS method.

The set of codec-specific thresholds 112 can be transmitted to the mobile device 102 in a system information block (SIB) that includes service information of the AP 106(1). For example, the AP 106(1) may, in response to receipt of the registration message 110, transmit a SIB with the set of codec-specific thresholds 112, a list of neighboring APs (e.g., the AP 106(2)) that are within a threshold distance from the AP 106(1) (sometimes referred to as a "neighbor list"), and other service information of the AP 106(1).

The thresholds in the set of codec-specific thresholds 112 can be defined in any suitable unit of measurement, such as decibel-milliwatts (dBm), decibels (dB), and the like. Upon receipt of the set of codec-specific thresholds 112, the mobile device 102 can store the set of codec-specific thresholds 112 in memory of the mobile device 102. The set of codec-specific thresholds 112 can be maintained in a data structure, such as lookup table or similar database, that associates each codec with a corresponding threshold, and thereby maintains a reference table with mappings between codecs and thresholds specific to those codecs. Maintaining this information in local memory allows the mobile device 102 to independently determine when to trigger a handover procedure based on radio signal measurements from the AP 106(1), as will be described in more detail below. The mobile device 102 can also store additional information it receives from the AP 106(1), such as the neighbor list included in the SIB.

At time, $T_1$, when the user 104 has carried the mobile device 102 to the location, $L_1$, but is still within the coverage area 108(1) of the AP 106(1), the user 104 may decide to call another user by selecting a contact from a contact list user interface on the mobile device 102, or by inputting a voice command to the mobile device 102. Up to this point, the mobile device 102 has been in the idle mode of operation. In response to this command from the user 104, the mobile device 102 transmits a session initiation message 114 to the AP 106(1). The session initiation message 114 can be in the form of a SIP INVITE method used to initiate a communication session with one or more other users.

As part of the session initiation message 114, or in a separate message, the mobile device 102 may inform the AP 106(1) of the codecs (audio and/or video codecs) that the mobile device 102 is capable of supporting. For example, an EVS-capable mobile device 102 can transmit a list of codecs including the EVS audio codec and one or more legacy audio codecs that the EVS-capable mobile device 102 can support. This capability information may be transmitted by the mobile device 102 in the form of a SIP OPTIONS method.

A codec negotiation procedure may occur after receipt of the session initiation message 114 where a common codec is established for the communication session. The common codec that is ultimately established may depend on the capabilities of the UEs and network entities that are to participate in the communication session, as well as network policies known to the AP 106(1). For example, if the mobile device 102 is EVS-capable, and the called party also has an EVS-capable UE, then the EVS audio codec may be selected for the communication session. When there are two or more candidate codecs that are each common to all UEs and network entities to be involved in the communication session, the codec used for the communication session may be selected based on its performance characteristics in that the selected codec 116 will result in the best voice and/or video quality for the communication session. The AP 106(1) transmits the selected codec 116 (i.e., the codec established for the communication session) to the mobile device 102 to inform the mobile device 102 of the codec that is established for the communication session.

Once a communication session is established, the AP 106(1) becomes the serving AP 106(1) for the communication session. During the communication session, the user 104 can move around to different locations and the mobile device 102 can monitor for a handover triggering event by looking up the relevant codec-specific threshold from local memory and taking radio signal measurements of the serving AP 106(1) at multiple different times (e.g., periodically). In order to lookup the relevant codec-specific threshold, the mobile device 102 can compare the selected codec 116 to the codecs relating to the codec-specific thresholds 112 that are maintained in the memory of the mobile device 102. Once a codec that matches the selected codec 116 is found in the lookup table, the handover triggering threshold that is specific to the matching codec may be used to monitor for the handover triggering event using the radio signal measurements from the serving AP 106(1).

The radio signal measurements taken by the mobile device 102 can measure any suitable parameter, such as a reference signal received power (RSRP) parameter, or a reference signal received quality (RSRQ) parameter. In general, the radio signal measurements can measure the radio signal strength and/or the radio signal quality from the serving AP 106(1), such as in the form of a signal-to-noise ratio. In the example of FIG. 1, the user 104, at time, $T_2$, has carried the mobile device 102 to the location, $L_2$, during a communication session. The location, $L_2$, is still within the coverage area 108(1) of the AP 106(1), but a radio signal measurement from the serving AP 106(1) taken by the mobile device 102 may be below the relevant codec-specific threshold in the set of codec-specific thresholds 112 due to the fact that the user 104 has moved close to the edge of the coverage area 108(1) of the serving AP 106(1). When the mobile device 102 determines that a radio signal measurement from the serving AP 106(1) falls below the relevant codec-specific threshold, this condition may be taken as a handover triggering event, causing the mobile device 102 to initiate a handover procedure by taking radio signal measurements from other APs within communication range of the mobile device 102, such as the AP 106(2). The mobile device 102 may utilize the neighbor list it received from the serving AP 106(1) in the SIB to identify neighboring APs from which it is to take radio signal measurements.

As the mobile device 102 takes radio signal measurements from the neighboring AP 106(2) (and possibly other neighboring APs), these radio signal measurements can be transmitted to the serving AP 106(1) in a measurement report 118. The serving AP 106(1), upon receipt of the measurement report 118, knows that the mobile device 102 wants to handover the communication session to a target AP that can better serve the mobile device 102 by providing a better quality (or stronger) radio signal. The serving AP 106(1) can analyze the measurement report 118, and upon determining that the mobile device 102 has taken enough measurements for the mobile device 102 to be provided a stable radio signal from a neighboring AP, the serving AP 106(1) can select a target AP 106(2) with the highest radio signal measurement and can send a handover command ("HO") 120 to the mobile device 102 with the target AP 106(2) identified for the mobile device 102.

The mobile device 102 can re-register with the target AP 106(2) via a session initiation message 122 in order to re-establish (e.g., re-INVITE) the communication session on the target AP 106(2) before terminating (or tearing down) the communication session with the serving AP 106(1). In this manner, the communication session can be transferred from the serving AP 106(1) to the target AP 106(2) that is in communication range of the mobile device 102. Once the mobile device 102 has re-established the communication session on the target AP 106(2), the communication session on the serving AP 106(1) can be terminated by sending a "handover complete" message to the serving AP 106(1), thereby completing the handover of the communication session to the target AP 106(2). Thereafter, the user 104 can continue with the communication session as he/she moves farther away from the AP 106(1)

By utilizing a handover triggering threshold from the set of codec-specific thresholds 112 that is specific to the codec used in an ongoing communication session, the mobile device 102 can leverage the performance enhancements provided by newer codecs by extending the communication session as far as possible from the serving AP 106(1) before transitioning the communication session to the target AP 106(2). Thus, for any codec, including a legacy codec (e.g., AMR), used for the communication session, the threshold specific to that codec can be utilized to trigger a handover procedure at an appropriate radio signal level so that the communication session can be extended over the full range of service provided by newer codecs, and so the communication session is not dropped prior to initiating a handover procedure for legacy codecs.

Figure 2:
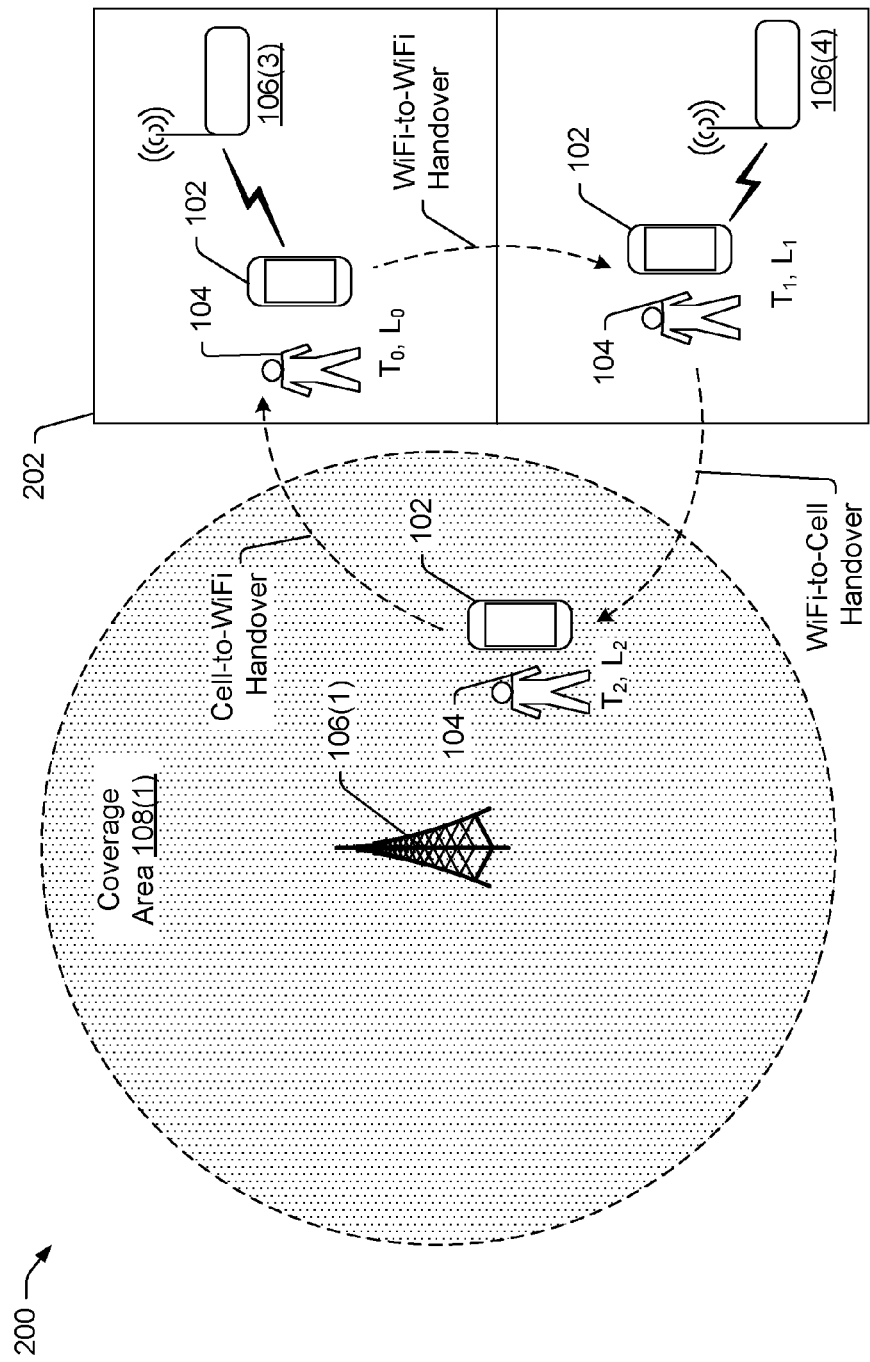
FIG. 2 illustrates another example cellular network environment for implementing a handover procedure for a mobile device by utilizing a codec-specific threshold.

FIG. 2 illustrates another example cellular network environment 200 for implementing a handover procedure for a mobile device 102 by utilizing a codec-specific threshold.

FIG. 2 illustrates examples of handovers between different types of APs, such as a handover between a base stations and wireless fidelity (WiFi™) APs, as well as handovers between two WiFi APs. Furthermore a "mobile-controlled" handover procedure is described with reference to FIG. 2. A "mobile-controlled" handover procedure is one where the operations involved in controlling the handover procedure are performed by the mobile device 102 during an ongoing communication session.

The cellular network environment 200 illustrates the fact that the IMS core is agnostic to the access technology that is used to connect the mobile device 102 to the IMS core. For example, the mobile device 102 can connect to the IMS core via a 3GPP or cellular-based AP, such as the base station AP 106(1) introduced in FIG. 1. Alternatively, the mobile device 102 can connect to the IMS core via a "non-3GPP" AP, such as a WiFi AP 106(3). Providing access through WiFi APs, such as the APs 106(3) and 106(4) shown in FIG. 2, has opened the door to recent advancements in IMS-based services, such as the introduction of Wi-Fi calling, which allows users to initiate and receive calls over an available Wi-Fi AP.

In the example of FIG. 2, the user 104, at time, $T_0$, may be at location, $L_0$, which corresponds to a particular room of a building 202. The user 104 is carrying the mobile device 102, and the mobile device 102 may be in communication range of an AP 106(3) that is configured to utilize a wireless communication protocol based on an IEEE 802.1x protocol, such as WiMAX, WiFi, and/or any future IEEE 802.1x network technology or evolution of an existing IEEE 802.1x protocol network technology. When the mobile device 102 is powered on and in idle mode, the mobile device 102 can register for an IMS-based service(s) in the same manner described herein with reference to FIG. 1, except that the communication of the registration message 110 in FIG. 1 is transmitted to the WiFi AP 106(3) instead of the cellular-based AP 106(1). However, the mobile device 102 shown in FIG. 2 may have previously stored the set of codec-specific thresholds 112 in local memory of the mobile device 102, such as having the set of codec-specific thresholds 112 hard-coded in memory of the mobile device 102 during manufacture of the mobile device 102, or receiving a software update with the set of codec-specific thresholds 112 at the mobile device 102.

The mobile device 102 can also initiate a communication session (e.g., a voice call) while at location, $L_0$, in response to a command received from the user 104. The initiation and establishment of the communication session can be performed similarly to the manner of initiating the communication session via the cellular-based AP 106(1) described with reference to FIG. 1. For example, a session initiation message 114 (e.g., a SIP INVITE method) can be transmitted to the IMS core via the WiFi AP 106(3), and after a codec negotiation process, a selected codec 116 can be established for the communication session between the user 104 and one or more other users. Once a communication session is established via the serving AP 106(3), the mobile device 102 is in active mode, and the user 104 can move around to different locations.

Because the mobile device 102 in the example of FIG. 2 does not receive a neighbor list from the WiFi AP 106(3), the mobile device 102 determines candidate APs in a different manner. For example, the mobile device 102 may periodically, or at random different times, scan for nearby APs (both cellular and WiFi-based APs) within communication range of the mobile device 102. Thus, when the mobile device 102 is within communication range (e.g., a coverage area) of the WiFi AP 106(4), the mobile device 102 can discover the WiFi AP 106(4) by scanning for WiFi APs using a WiFi radio chip (or chipset) of the mobile device 102.

When the user 104 carries the mobile device 102 during a communication session to a different room/area of the building 202 that includes the WiFi AP 106(4), the mobile device 102 may determine, through radio signal measurements obtained from the serving AP 106(3), that the radio signal level from the serving AP 106(3) has fallen below a codec-specific threshold relating to the selected codec 116 established for the communication session. That is, the mobile device 102, upon receiving the selected codec 116 that is established for the communication session, may access the set of codec-specific thresholds 112 in local memory to find a codec that matches the selected codec 116, and the mobile device 102 can monitor radio signal measurements from the serving AP 106(3) against the relevant codec-specific threshold to determine if a handover procedure is triggered.

When a radio signal measurement from the serving AP 106(3) falls below the relevant codec-specific threshold, a handover procedure is triggered, causing the mobile device 102 to take radio signal measurements of nearby APs discovered by scanning for nearby APs, such as the WiFi AP 106(4). When the user 104, at time, $T_1$, arrives at the location, $L_1$, and when the handover procedure is triggered, the mobile device 102 may discover (or may have previously discovered) the WiFi AP 106(4) by scanning for WiFi APs with the WiFi radio chip. Thereafter, the mobile device 102 can take radio signal measurements of the WiFi AP 106(4) and any other APs it discovers to be within communication range of the mobile device 102. The mobile device 102 can analyze the radio signal measurements to determine if the radio signal from the WiFi AP 106(4) is stable, and if so, the mobile device 102 can re-establish the communication session via the target AP 106(4) as part of the handover process. Assuming that there are other nearby APs, the target AP 106(4) may be selected based on having a highest radio signal level among multiple measurements taken from multiple available APs in communication range of the mobile device 102. When the communication session is successfully re-established via the target AP 106(4), the communication session can be terminated via the serving AP 106(3) to complete the transfer of the communication session.

FIG. 2 also illustrates an example where the user 104 moves from location, $L_1$, to a location, $L_2$, that is outside of the building 202 while the communication session is continued on the mobile device 102. At time, $T_2$, after the user 104 has moved to location, $L_2$, which is farther away from the now serving AP 106(4) than location, $L_1$, the mobile device 102 may determine that a radio signal measurement from the serving AP 106(4) falls below the relevant codec-specific threshold for the ongoing communication session, which triggers another handover procedure. When the handover procedure is triggered, the mobile device 102 may be within the coverage area 108(1) of the base station AP 106(1). In addition to using a WiFi radio chip of the mobile device 102 to scan for WiFi APs, the mobile device 102 may utilize a cellular radio chip (or chipset) to scan for cellular-based APs, such as the 3GPP base station AP 106(1). Thus, the mobile device 102 can discover the base station AP 106(1) using a cellular radio chip of the mobile device 102, and the mobile device 102 can take radio signal measurements from the AP 106(1). It is to be appreciated that the mobile device 102 can scan for available APs (both cellular and WiFi) at multiple different times (e.g., periodically), and/or in response to a handover triggering event. Furthermore, the cellular radio chip and the WiFi radio chip of the mobile device 102 can operate simultaneously to scan for respective APs in parallel. When the mobile device 102 has re-established the communication session via the base station AP 106(1), a handover from the serving WiFi AP 106(4) to the target base station AP 106(1) may be completed by terminating the communication session with the serving WiFi AP 106(4).

FIG. 2 also shows a cell-to-WiFi handover example where the user 104 moves from location, $L_2$, and returns to location, $L_0$. In this scenario, the mobile device 102, upon moving away from the serving AP 106(1) may determine that a radio signal measurement from the serving AP 106(1) is below the relevant codec-specific threshold, thereby triggering a handover procedure. The mobile device 102 can scan for WiFi APs within communication range of the mobile device 102 to discover that the WiFi AP 106(3), among other possible APs within communication range of the mobile device 102. When the handover procedure is triggered, the mobile device 102 can take radio signal measurements from the WiFi AP 106(3) and determine that the radio signal from the WiFi AP 106(3) is stable, and that it provides the highest radio signal strength or quality among multiple available radio signals from other APs. Thereafter, the communication session can be transferred from the serving base station AP 106(1) to the target WiFi AP 106(3) by re-establishing the communication session via the target WiFi AP 106(3) and terminating the communication session via the serving base station AP 106(1).

In this manner, the mobile device 102 can operate in a mobile-controlled handover implementation to handover a communication session between any of the APs shown in FIG. 2. It is to be appreciated that the mobile-controlled handover implementation may be utilized in the cellular network environment 100 of FIG. 1 as well (i.e., instead of the mobile-assist, network-controlled handover implementation). Moreover, the mobile device 102 at location, $L_2$, of FIG. 2 may be configured to implement the mobile-assist, network-controlled handover procedure described with reference to FIG. 1. In this scenario, the serving AP 106(1) sends a SIB containing a neighbor list of nearby base station APs and the set of codec-specific thresholds 112 so that the mobile device 102 can utilize a codec-specific threshold for a handover to a nearby target base station AP.

In some implementations, when the user 104 is located at location, $L_2$, in FIG. 2, and when a mobile-assist, network-controlled handover is implemented, the mobile device 102 can take radio signal measurements from nearby WiFi APs in addition to taking radio signal measurements from base station APs that are provided in a neighbor list from the serving AP 106(1). In other words, if a WiFi AP, such as the WiFi AP 106(3) is within communication range of the mobile device 102 when a handover triggering event occurs, the WiFi radio chip of the mobile device 102 can scan for nearby WiFi APs to discover the WiFi AP 106(3) and take radio signal measurements from the WiFi AP 106(3) in addition to taking radio signal measurements from neighboring base stations known to the serving base station AP 106(1). In this example, the mobile device 102 may include the radio signal measurement of the WiFi AP 106(3) in a measurement report 118 sent to the serving base station AP 106(1) along with a device identifier (e.g., a media access control (MAC) address) of the WiFi AP 106(3). Thus, the serving AP 106(1) can be configured to analyze the measurement report 118 for all available APs, both cellular and WiFi, to determine a best performing AP to select as the target AP. In this manner, an evaluation of cellular vs. WiFi can be implemented into a handover procedure that utilizes codec-specific thresholds. This cellular vs. WiFi technique can also be applied in the cellular network environment 200 of FIG. 2 where both WiFi and cellular-based APs are available and within communication range of the mobile device 102. In a mobile-controlled handover implementation, the mobile device 102 can analyze the radio signal measurements taken from all available (both cellular and WiFi) APs to determine a best performing AP to select as the target AP.

In the scenario where the mobile device 102 is preconfigured with a set of codec-specific thresholds 112 in local memory (e.g., during manufacture, in a software update/download, etc.), and in a mobile-assist, network-controlled handover implementation, the mobile device 102 may receive, in a SIB from the serving base station AP 106(1), a set of codec-specific thresholds 112 from the serving base station AP 106(1) that is different from the codec-specific thresholds 112 it has stored in local memory. In this sense, the set of thresholds stored in local memory and the set of thresholds received from the serving base station AP 106(1) may conflict to some degree. For example, a set of codec-specific thresholds 112 obtained in a software update may include an EVS-specific threshold of −120 dBm, while a different set of codec-specific thresholds 112 received from a serving base station AP 106(1) may include an EVS-specific threshold of −117 dBm. In this case, the mobile device 102 has two different EVS-specific thresholds available for use in determining a handover triggering event. The mobile device 102 may include logic for choosing one conflicting threshold over the other, such as using the set of codec-specific thresholds 112 in memory in lieu of any conflicting codec-specific thresholds 112 it receives from the serving base station AP 106(1) in a SIB. Alternatively, the mobile device 102 may be programmed to use the set of codec-specific thresholds 112 it receives from the serving base station AP 106(1) in lieu of the set of codec-specific thresholds 112 it currently has stored in local memory. In some embodiments, the codec-specific thresholds may be time-stamped to indicate a time when they were updated, and the mobile device 102 may be programmed to select the newer threshold (i.e., the threshold with the most recent timestamp) as an overriding codec-specific threshold.

Figure 3:
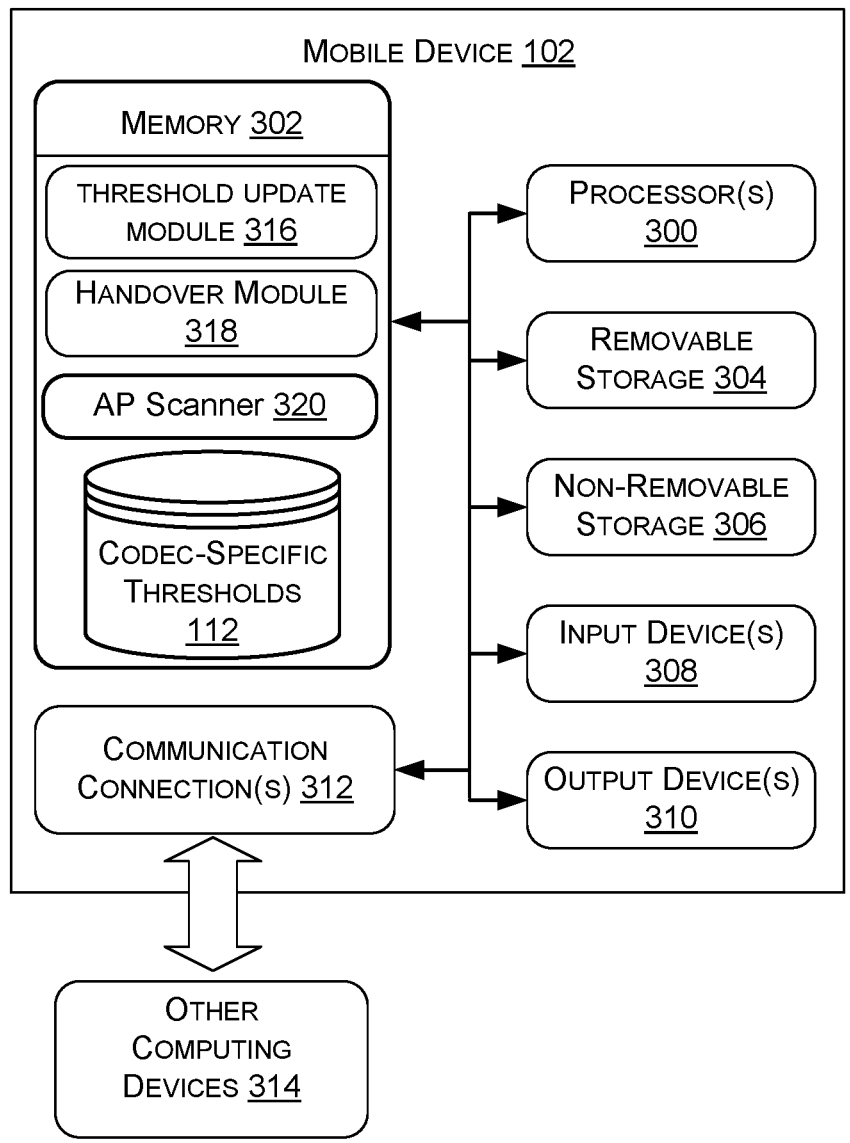
FIG. 3 is a block diagram of an example mobile device architecture in accordance with various embodiments.

FIG. 3 is a block diagram of an example architecture of the mobile device 102 in accordance with various embodiments. As shown, the mobile device 102 may include one or more processors 300 and one or more forms of computer-readable memory 302. The mobile device 102 may also include additional storage devices. Such additional storage may include removable storage 304 and/or non-removable storage 306.

In various embodiments, the computer-readable memory 302 is non-transitory and can include both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The non-transitory computer-readable memory 302 may also be described as computer storage media and may include volatile and nonvolatile, removable and non-removable media implemented in any method or technology for storage of information, such as computer readable instructions, data structures, program modules, or other data. Computer-readable memory 302, as well as the removable storage 304 and non-removable storage 306, are all examples of non-transitory computer-readable storage media. Non-transitory computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the mobile device 102. Any such non-transitory computer-readable storage media may be part of the mobile device 102.

The mobile device 102 may further include input devices 308, including, without limitation, a touch screen (e.g., touch, or proximity-based) display, physical buttons (e.g., keyboard or keypad), a camera-based sensor configured to receive gestural input from a user, a microphone or microphone array for receiving voice input commands from a user, pointing devices (e.g., mouse, pen, stylus, etc.), or any other suitable input devices 308 coupled communicatively to the processor(s) 300 and the computer-readable memory 302. The mobile device 102 may further include output devices 310, including, without limitation, a display, one or more light-emitting diode (LED) indicators, speakers, a printer, or any other suitable output device coupled communicatively to the processor(s) 300 and the computer-readable memory 302.

The mobile device 102 may further include communications connection(s) 312 that allow the mobile device 102 to communicate with other computing devices 314 such as via a network (e.g., an IMS network). The communications connection(s) 312 may facilitate transmitting and receiving wireless signals over any suitable wireless communications/data technology, standard, or protocol, as described above, such as using licensed, semi-licensed, or unlicensed spectrum over a telecommunications network. For example, the communication connection(s) 312 may represent at least one cellular radio (or cellular radio chip/chipset), at least one wireless IEEE 802.1x-based radio interface (e.g., a WiFi radio chip/chipset), as well as other types of wireless (e.g., Bluetooth®) and wireline communications interfaces.

In some embodiments, the computer-readable memory 302 may include a threshold update module 316 configured to receive and store a set of multiple codec-specific thresholds 112. The set of codec specific thresholds 112 received by the threshold update module 316 may be received at any suitable time, such as during manufacture of the mobile device 102 (e.g., hard-coding the set of codec-specific thresholds 112), in a software update initiated by the mobile device 102 or by the user 104, and/or in response to a registration message 110 sent to a base station AP, such as the base station AP 106(1).

The computer-readable memory 302 may further include a handover module 318 configured to implement a handover algorithm in either or both of a mobile-assist, network-controlled handover implementation, or a mobile-controlled handover implementation. The handover module 318 is therefore configured to determine the selected codec 116 that has been established for a communication session with another UE(s), compare the selected codec 116 to the codecs stored in memory to determine a relevant codec-specific threshold in the set of codec-specific thresholds 112 to use in monitoring for a handover triggering event. The handover module 318 may monitor for a handover triggering event by taking radio signal measurements via the communication connection(s) 312 (e.g., via the cellular radio and/or WiFi radio) and comparing the radio signal measurements to the relevant codec-specific threshold. In a mobile-assist, network-controlled handover implementation, the handover module 318 may be configured to send a measurement report 118 via the communication connection(s) 312 to a serving AP, such as the serving AP 106(1). In a mobile-controlled handover implementation, the handover module 318 may be configured to analyze the radio signal measurements to determine a best performing AP with the highest radio signal measurement, and to select the best performing AP as a target AP for completing the handover procedure.

The computer-readable memory 302 may further include an AP scanner 320 configured to scan, via the communication connection(s) 312, for available APs within communication range of the mobile device 102. For example, a WiFi radio chip may be used by the AP scanner 320 to scan for WiFi APs within communication range of the mobile device 102, while a cellular radio chip may be utilized to scan for cellular-based APs, such as base stations. The AP scanner 320 may utilize a timer to determine when to scan for available APs within communication range of the mobile device 102, such as scanning every 10 seconds. The AP scanner 320 may additionally, or alternatively, be event-driven, such that the AP scanner 320 is configured to scan for available APs (both cellular and WiFi) in response to a handover triggering event that is based on the radio signal of the serving AP falling below the relevant codec-specific threshold.

Figure 4:
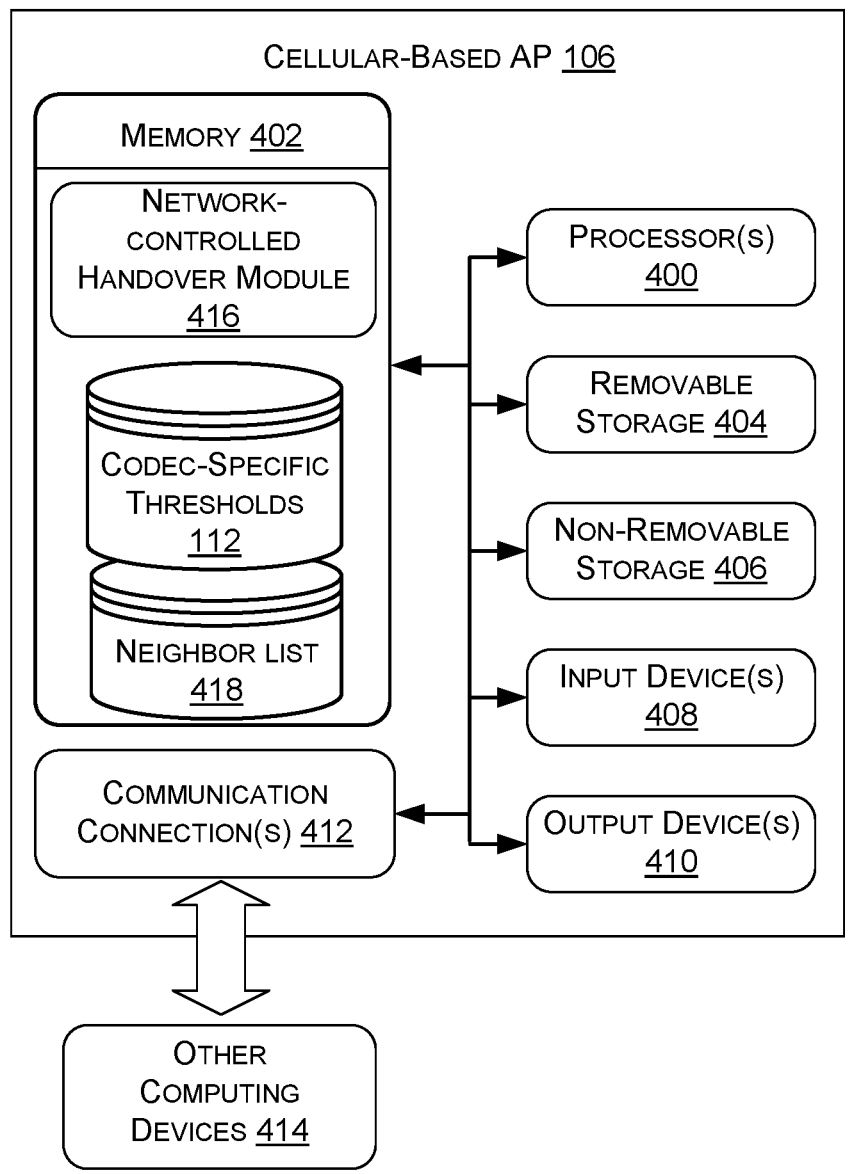
FIG. 4 is a block diagram of a cellular-based access point (AP) in accordance with various embodiments.

FIG. 4 is a block diagram of a cellular-based access point (AP) 106 in accordance with various embodiments. As shown, the cellular-based AP 106 may include one or more processors 400 and one or more forms of computer-readable memory 402. The cellular-based AP 106 may also include additional storage devices. Such additional storage may include removable storage 404 and/or non-removable storage 406. The computer-readable memory 402, as well as the removable storage 404 and non-removable storage 406 may comprise any of the types of non-transitory computer-readable storage media described with reference to the mobile device 102 of FIG. 3.

The cellular-based AP 106 may further include input devices 408, such as buttons (e.g., keyboard or keypad), and output devices 410, such as a display. The cellular-based AP 106 may further include communications connection(s) 412 that allow the cellular-based AP 106 to communicate with other computing devices 414 such as via a network (e.g., an IMS network). The communications connection(s) 412 may facilitate transmitting and receiving wireless signals over any suitable wireless communications/data technology, standard, or protocol, as described above, such as using licensed, semi-licensed, or unlicensed spectrum over a telecommunications network.

In some embodiments, the computer-readable memory 402 may include a network-controlled handover module 416 configured to implement a mobile-assist, network-controlled handover procedure for a mobile device 102. Accordingly, the network-controlled handover module 416 may transmit a SIB including a neighbor list 418 to inform the mobile device 102 of neighboring base station APs, as well as other service information of the cellular-based AP 106. The network-controlled handover module 416 may further be configured to include in the SIB, the set of codec-specific thresholds 112 to inform the mobile device 102 of the various codec-specific thresholds it can use to monitor for a handover triggering event. The codec-specific thresholds 112 may be periodically updated by a carrier of IMS-based services, such as when new codecs are developed, or when performance characteristics of particular codecs change so that different codec-specific thresholds are to be implemented in a handover procedure.

The network-controlled handover module 416 may be further configured to receive and process a measurement report 118 from a mobile device 102 that includes radio signal measurements of both cellular-based neighboring APs (e.g., neighboring base stations) and WiFi APs in communication range of the mobile device 102. That is, the network-controlled handover module 416 can allow for the inclusion of WiFi APs in the measurement report 118 by including a device identifier (e.g., a MAC address) of a WiFi AP in the measurement report 118 so that the radio signal measurements of the WiFi AP can be considered along with radio signal measurements of base station APs in the neighbor list 418.

Example Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 5:
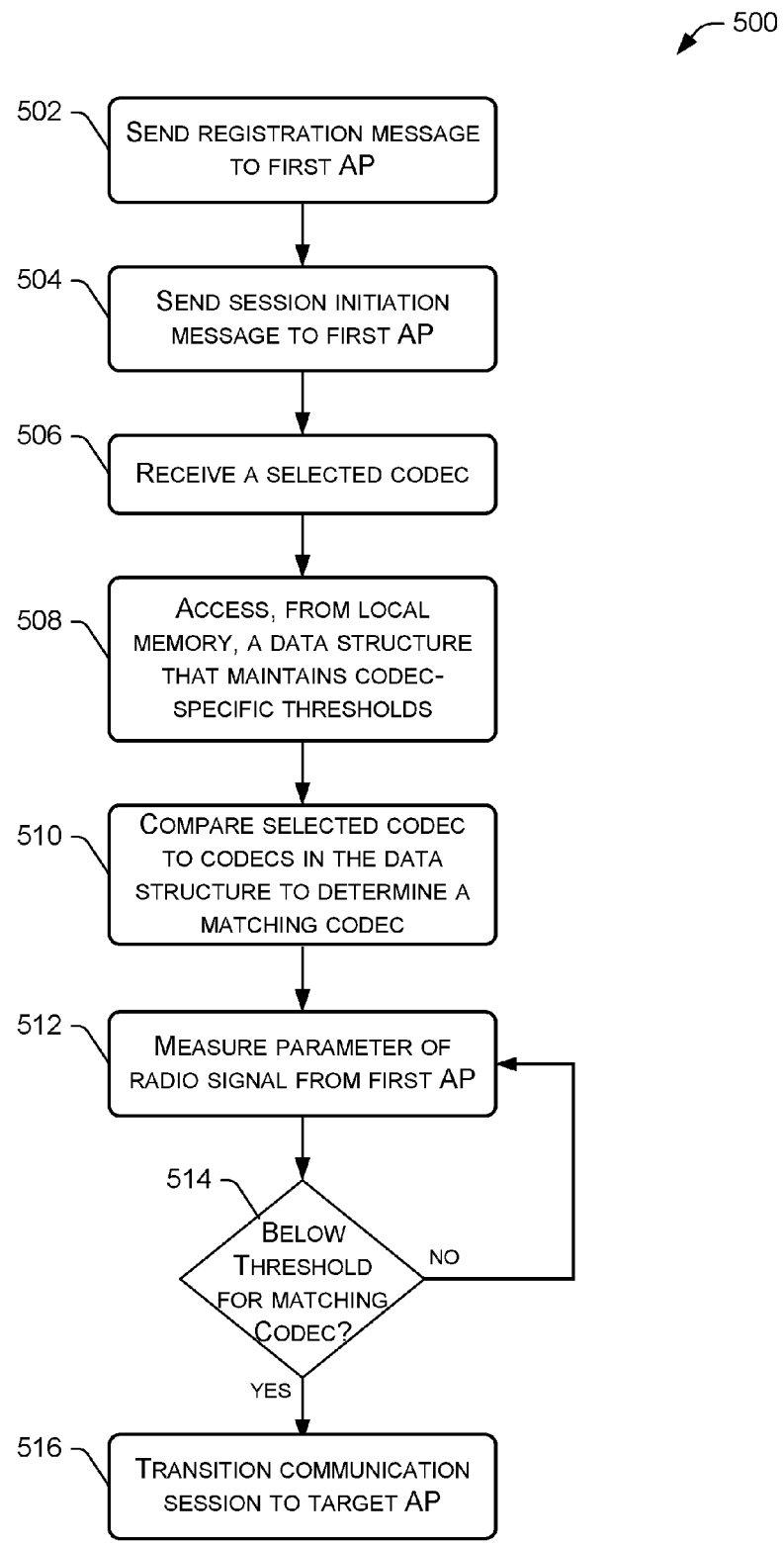
FIG. 5 illustrates a flowchart of an example process for transitioning a communication session from a serving AP to a target AP based on a codec-specific threshold.

FIG. 5 illustrates a flowchart of an example process 500 for transitioning a communication session from a serving AP to a target AP based on a codec-specific threshold. The process 500 may be implemented by the mobile device 102 and relevant components of the mobile device 102, such as the handover module 318, among other components.

At 502, the mobile device 102 may send a registration message 110 to a first AP 106. The first AP 106 may comprise a cellular-based AP, such as a 3GPP base station, or a WiFi AP. The registration message 110 may comprise a SIP REGISTER method that allows the mobile device 102 to register for an IMS-based service, such as voice calling, video calling, and similar services. When the first AP 106 comprises a 3GPP base station, such as an enhanced NodeB (eNodeB), the mobile device 102 may receive, in response to sending the registration message 110, a SIB from the base station AP 106 that includes service information for the base station AP 106 including, without limitation, a neighbor list 418 of neighboring base station APs, and a set of codec-specific thresholds 112 that the mobile device 102 stores in local memory. In some implementations, the mobile device 102 has previously stored the set of codec-specific thresholds 112 in local memory, such as when the thresholds 112 are hard-coded in the memory of the mobile device 102 at manufacture, or when the mobile device 102 receives a software update including the set of codec-specific thresholds.

At 504, the mobile device 102 may send a session initiation message 114 to the first AP 106 in order to initiate a communication session, such as a voice communication session or a video communication session. The session initiation message 114 may comprise a SIP INVITE method.

At 506, after the network negotiates a codec for the communication session, the mobile device 102 may receive the selected codec 116. The selected codec 116 can comprise an audio codec, such as the EVS audio codec, or a video codec such as the H.263 codec, and is a common codec that all UEs and network entities involved in the communication session can implement. For example, if the first AP 106 is a legacy AP that is configured to implement the AMR-WB audio codec, the selected codec 116 may comprise the AMR-WB audio codec.

At 508, the handover module 318 of the mobile device 102 may access a data structure, such as a lookup table, that maintains the set of codec-specific thresholds 112. Again, the set of codec-specific thresholds 112 may have been hardcoded in the mobile device 102 at manufacture, downloaded in a software update, or received from the first AP 106 in response to sending the registration message 110 at 502. For example, the set of codec-specific thresholds 112 can include a first codec-specific threshold of −120 dBm that is associated with a first codec, such as the EVS audio codec, and a second codec-specific threshold of −117 dBm that is associated with a second codec, such as the AMR-WB audio codec.

At 510, the handover module 318 can compare the selected codec 116 to the codecs in the data structure maintaining the set of codec-specific thresholds 112 to determine a matching codec. For example, if the selected codec 116 is the EVS audio codec for a voice communication session, the handover module 318 can lookup the EVS audio codec in the lookup table stored in the mobile device's 102 memory. Once the matching EVS audio codec is identified in the data structure, the mobile device 102 knows to monitor radio signal levels from the first, serving AP 106 against the threshold specific to the EVS audio codec.

At 512, the handover module 318 measures a parameter of a radio signal from the first, serving AP 106. The parameter can comprise a RSRP parameter, a RSRQ parameter, or any suitable parameter that is indicative of radio signal strength and/or quality. The measurement at 512 may be timer-based in that the mobile device 102 periodically measures the parameter of the radio signal at regular intervals, or the measurement at 512 may be event-based.

At 514, a determination is made as to whether the parameter measured at 512 is below the relevant codec-specific threshold. Continuing with the previous example, when the selected codec 116 is the EVS audio codec, the parameter measured at 512 is compared to the EVS-specific threshold of −120 dBm to determine if the measured parameter is below the EVS-specific threshold. If not, the process 500 follows the "NO" route back to 512 where the mobile device 102 measures the parameter again at a later point in time.

Once the mobile device 102 takes a radio signal measurement from the first AP 106 that is below the codec-specific threshold at 514, the process 500 follows the "YES" route to 516 to transition the communication session to a target AP 106. The target AP 106 can be identified in various ways, as described herein. For example, the target AP 106 can comprise a neighboring base station AP 106(2) that is included in the neighbor list 418 received from the serving, first AP 106 when the first AP 106 is a base station AP. Additionally, or alternatively, the target AP 106 may be identified by the AP scanner 320 of the mobile device 102. In this scenario, the target AP 106 can comprise a WiFi AP discovered by the AP scanner 320 via the WiFi radio chip of the mobile device 102, or the target AP 106 can comprise a base station AP discovered by the AP scanner 320 via the cellular radio chip of the mobile device 102. Furthermore, the transitioning of the communication session at 516 can be implemented in a mobile-assist, network-controlled manner where radio signal measurements of APs in communication range of the mobile device are sent in a measurement report 118 to the first, serving AP 106. This measurement report 118 can also include device identifiers of, and radio signal measurements from, WiFi APs discovered by the AP scanner 320. In a mobile-controlled handover implementation, the transitioning at 516 can include the mobile device 102 analyzing radio signal measurements from available APs in communication range of the mobile device 102 and determining a best performing AP to select as the target AP 106.

In the specific example described with reference to FIG. 5, by utilizing a threshold of −120 dBm that is specific to the EVS audio codec, the mobile device 102 can extend an EVS-based communication session to farther distances from a serving AP as compared a single threshold that is common across all audio codecs. That is, if the −117 dBm were used for both an EVS-based communication session and an AMR-WB-based communication session, the EVS-based communication session will be handed over to a target AP too early. Meanwhile, if the −120 dBm were used for both an EVS-based communication session and an AMR-WB-based communication session, the AMR-WB-based communication session would drop before a handover could be initiated.

In some implementations, after the transitioning of the communication session at 516, the communication session can be continued by re-establishing the communication session served by the target AP 106 instead of the first AP 106 that initiated the communication session. In some examples, the first AP 106 employs a newer RAT than the target AP 106, which employs some legacy RAT. Therefore, the target AP 106 may not be capable of supporting the selected codec 116 that was used for the communication session when served by the first AP 106. Accordingly, a new codec may be selected for continuing the communication session served by the target AP 106. Since the new selected codec, in this example, is different from the selected codec 116 received at 506 from the first AP 106, the mobile device 102 may again access, from local memory, the codec-specific thresholds 112 to find a codec in the data structure (e.g., lookup table) that matches the new selected codec. The handover triggering threshold that is specific to the matching codec can then be used to monitor for a handover triggering event. For instance, during the communication session served by the target AP 106, the mobile device 102 can measure a parameter of a radio signal (e.g., the RSRP parameter, the RSRQ parameter, etc.) from the target AP 106 to obtain a radio signal measurement for the target AP 106, and if the radio signal measurement is above the codec-specific threshold associated with the matching codec, the communication session may continue to be served by the target AP 106. However, upon determining that a radio signal measurement of the target AP 106 falls below the codec-specific threshold associated with the matching codec, the communication session may again be transitioned to a new target AP 106 in communication range of the mobile device 106. Thus, the handover from the target AP 106 to a new target AP 106 may be based on a codec-specific threshold that is different from the codec-specific threshold used previously to transition the communication session from the first AP 106 to the target AP 106.

Figure 6:
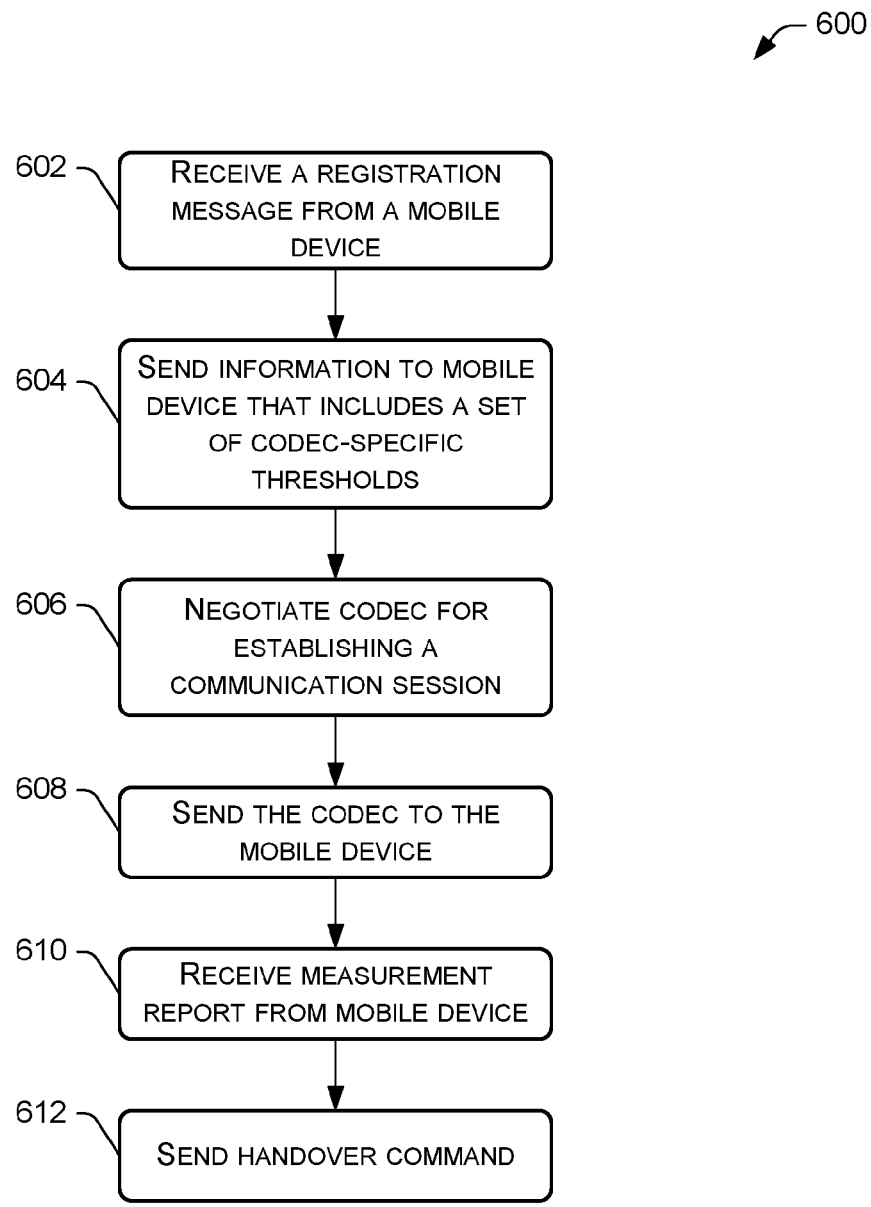
FIG. 6 illustrates a flowchart of an example process for a mobile-assist, network-controlled implementation of a handover procedure.

FIG. 6 illustrates a flowchart of an example process 600 for a mobile-assist, network-controlled implementation of a handover procedure. The process 600 may be implemented by the cellular-based AP 106 of FIG. 4, and relevant components of the cellular-based AP 106, such as the network-controlled handover module 416, among other components.

At 602, the cellular-based AP 106 can receive a registration message 110 from a mobile device 102. The registration message 110 may comprise a SIP REGISTER method.

At 604, the cellular-based AP 106 can send information to the mobile device 102, the information including a set of codec-specific thresholds 112 that the mobile device 102 is to store in memory of the mobile device 102 for use in monitoring for a handover triggering event. The set of codec-specific thresholds 112 can be sent to the mobile device 102 in a SIB that includes other service information of the cellular-based AP 106, such as a neighbor list 418 that specifies neighboring base station APs to that of the cellular-based AP 106.

At 606, the cellular-based AP 106 can negotiate a codec for establishing a communication session for the mobile device 102. For example, the mobile device 102 may send a SIP INVITE method to the cellular-based AP 106 to initiate a communication session, and the cellular-based AP 106 may help negotiate an audio codec and/or a video codec for the communication session.

At 608, the selected codec 116 is sent to the mobile device 102 so that the mobile device 102 can lookup the selected codec 116 in the stored set of codec-specific thresholds 112 and determine the corresponding codec-specific threshold to use for monitoring a handover triggering event.

Once a handover procedure is triggered at the mobile device 102, the cellular-based AP 106 receives a measurement report 118 from the mobile device 102 at 610. The measurement report 118 can include radio signal measurements taken by the mobile device 102 with respect to one or more APs (both cellular and WiFi) within communication range of the mobile device 102. Accordingly, the measurement report 118 can include radio signal measurements (e.g., measured RSRP parameters, RSRQ parameters, etc.) for neighboring cellular base station APs, neighboring WiFi APs, or both.

At 612, the cellular-based AP 106 may send a handover command 120 to the mobile device 102 information the mobile device 102 of a target AP 106 selected by the cellular-based AP 106. Accordingly, the cellular-based AP 106 can analyze the measurement report 118 to select a best performing AP (e.g., the AP with the highest radio signal measurement) as the target AP for the handover. This handover command 120 is received by the mobile device 102 to re-register with the target AP 106 and to transition the communication session to the target AP.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A computer-implemented method comprising:
   receiving, from a mobile device, a registration message at a serving base station configured to provide access to an Internet Protocol (IP) Multimedia Subsystem (IMS) core;
   sending, by the serving base station, information to the mobile device that includes:
     a first codec-specific threshold in association with a first codec; and
     a second codec-specific threshold in association with a second codec, wherein the first codec-specific threshold and the second codec-specific threshold are different thresholds;
   receiving, from the mobile device, a session initiation message at the serving base station to establish a communication session for the mobile device;
   negotiating a codec for the communication session involving the mobile device;
   sending, by the serving base station, the codec to the mobile device; and
   terminating the communication session for the mobile device with the serving base station.

2. The computer-implemented method of claim 1, further comprising, after sending the codec to the mobile device, and prior to terminating the communication session:
   receiving a measurement report from the mobile device, the measurement report including a radio signal measurement of a target access point (AP) configured to provide access to the IMS core; and
   sending a handover command to the mobile device to transition the communication session from the serving base station to the target AP.

3. The computer-implemented method of claim 2, wherein the target AP comprises a WiFi AP.

4. The computer-implemented method of claim 3, wherein the measurement report further includes a device identifier of the WiFi AP, the method further comprising sending the device identifier of the WiFi AP to the mobile device to instruct the mobile device to assist in transitioning the communication session from the serving base station to the WiFi AP.

5. The computer-implemented method of claim 2, wherein:
   the information further includes a neighboring base station within a threshold distance from the serving base station; and
   the target AP comprises the neighboring base station.

6. The computer-implemented method of claim 1, wherein the first codec-specific threshold and the second codec-specific threshold are selected based on capabilities of the mobile device.

7. The computer-implemented method of claim 1, wherein sending the information to the mobile device occurs in response to receiving the registration message from the mobile device.

8. A cellular-based access point (AP) comprising:
   a processor; and
   memory storing computer-executable instructions that, when executed by the processor, cause the cellular-based AP to perform operations comprising:
     receiving, from a mobile device, a registration message;
     sending information to the mobile device that includes:
       a first codec-specific threshold in association with a first codec; and
       a second codec-specific threshold in association with a second codec, wherein the first codec-specific threshold and the second codec-specific threshold are different thresholds;
     receiving, from the mobile device, a session initiation message to establish a communication session for the mobile device;
     negotiating a codec for the communication session involving the mobile device;
     sending the codec to the mobile device; and
     terminating the communication session for the mobile device with the cellular-based AP.

9. The cellular-based AP of claim 8, the operations further comprising, after sending the codec to the mobile device, and prior to terminating the communication session:
   receiving a measurement report from the mobile device, the measurement report including a radio signal measurement of a target access point (AP) configured to provide access to an Internet Protocol (IP) Multimedia Subsystem (IMS) core; and
   sending a handover command to the mobile device to transition the communication session from the cellular-based AP to the target AP.

10. The cellular-based AP of claim 9, wherein the target AP comprises a WiFi AP.

11. The cellular-based AP of claim 10, wherein the measurement report further includes a device identifier of the WiFi AP, the operations further comprising sending the device identifier of the WiFi AP to the mobile device to instruct the mobile device to assist in transitioning the communication session from the cellular-based AP to the WiFi AP.

12. The cellular-based AP of claim 9, wherein:
   the information further includes a neighboring base station within a threshold distance from the cellular-based AP; and
   the target AP comprises the neighboring base station.

13. The cellular-based AP of claim 8, wherein the first codec-specific threshold and the second codec-specific threshold are selected based on capabilities of the mobile device.

14. The cellular-based AP of claim 8, wherein sending the information to the mobile device occurs in response to receiving the registration message from the mobile device.

15. One or more non-transitory computer-readable storage media of a serving base station, the one or more non-transitory computer-readable storage media storing computer-executable instructions that, when executed by one or more processors of the serving base station, cause the serving base station to perform operations comprising:
   receiving, from a mobile device, a registration message;
   sending information to the mobile device that includes:

a first codec-specific threshold in association with a first codec; and a second codec-specific threshold in association with a second codec, wherein the first codec-specific threshold and the second codec-specific threshold are different thresholds;

receiving, from the mobile device, a session initiation message to establish a communication session for the mobile device;

negotiating a codec for the communication session involving the mobile device;

sending the codec to the mobile device; and terminating the communication session for the mobile device with the serving base station.

16. The one or more non-transitory computer-readable storage media of claim 15, the operations further comprising, after sending the codec to the mobile device, and prior to terminating the communication session:

receiving a measurement report from the mobile device, the measurement report including a radio signal measurement of a target access point (AP) configured to provide access to an Internet Protocol (IP) Multimedia Subsystem (IMS) core; and sending a handover command to the mobile device to transition the communication session from the serving base station to the target AP.

17. The one or more non-transitory computer-readable storage media of claim 16, wherein the target AP comprises a WiFi AP.

18. The one or more non-transitory computer-readable storage media of claim 17, wherein the measurement report further includes a device identifier of the WiFi AP, the operations further comprising sending the device identifier of the WiFi AP to the mobile device to instruct the mobile device to assist in transitioning the communication session from the serving base station to the WiFi AP.

19. The one or more non-transitory computer-readable storage media of claim 15, wherein the first codec-specific threshold and the second codec-specific threshold are selected based on capabilities of the mobile device.

20. The one or more non-transitory computer-readable storage media of claim 15, wherein sending the information to the mobile device occurs in response to receiving the registration message from the mobile device.

* * * * *